(12) United States Patent
Barth et al.

(10) Patent No.: US 10,504,516 B2
(45) Date of Patent: Dec. 10, 2019

(54) VOICE CONTROL FOR EMERGENCY VEHICLE

(71) Applicant: Federal Signal Corporation, Oak Brook, IL (US)

(72) Inventors: Justin Barth, Elgin, IL (US); Paul Ferrara, Frankfort, IL (US); Jorge Guerreiro, Bolingbrook, IL (US); Albena Iotova-Gagnaire, Elmhurst, IL (US); Michael Pula, Naperville, IL (US); Scott Thomas Rohrbaugh, Clarendon Hills, IL (US)

(73) Assignee: Federal Signal Corporation, Oak Brook, IL (US)

( * ) Notice: Subject to any disclaimer, the term of this patent is extended or adjusted under 35 U.S.C. 154(b) by 127 days.

(21) Appl. No.: 15/880,060

(22) Filed: Jan. 25, 2018

(65) Prior Publication Data

US 2019/0080693 A1 Mar. 14, 2019

Related U.S. Application Data

(60) Provisional application No. 62/557,865, filed on Sep. 13, 2017.

(51) Int. Cl.
*G10L 15/22* (2006.01)
*H04R 1/32* (2006.01)
*G06F 16/683* (2019.01)

(52) U.S. Cl.
CPC ............ *G10L 15/22* (2013.01); *G06F 16/683* (2019.01); *H04R 1/326* (2013.01); *G10L 2015/223* (2013.01); *H04R 2499/13* (2013.01)

(58) Field of Classification Search
CPC combination set(s) only.
See application file for complete search history.

(56) References Cited

U.S. PATENT DOCUMENTS

| | | | |
|---|---|---|---|
| 8,214,219 B2 | 7/2012 | Prieto et al. | |
| 8,688,458 B2* | 4/2014 | Buck | B60R 16/0373 381/92 |
| 2008/0118080 A1* | 5/2008 | Gratke | B60R 16/0373 381/86 |
| 2013/0332165 A1* | 12/2013 | Beckley | G10L 17/04 704/246 |
| 2018/0190282 A1* | 7/2018 | Mohammad | G10K 11/178 |

\* cited by examiner

*Primary Examiner* — Abul K Azad
(74) *Attorney, Agent, or Firm* — Merchant & Gould P.C.

(57) ABSTRACT

A voice control system for a police vehicle, including: a single azimuthally-sensitive directional microphone configured to receive an audio command for controlling an aspect of the police vehicle and identify a direction of origin of the audio command; and a controller including a processor and tangible memory encoding instructions which, when executed by the processor, cause the controller to: identify a command associated with the audio command received by the single azimuthally-sensitive directional microphone; and when the direction of origin allows for the command, initiate the command to control the aspect of the police vehicle.

17 Claims, 5 Drawing Sheets

VOICE CONTROL FOR EMERGENCY VEHICLE

RELATED APPLICATION(S)

This patent application claims the benefit of U.S. Patent Application Ser. No. 62/557,865 filed on Sep. 13, 2017, the entirety of which is hereby incorporated by reference.

BACKGROUND

As emergency vehicles, such as police vehicles, become more sophisticated, the processes to control the vehicles also become more complex. The ease at which a police officer can control the various aspects of the vehicle becomes important, particularly when the officer is operating the vehicle at high rates of speed. Removing the officer's eyes from the road to control aspects of the vehicle can create dangerous conditions.

SUMMARY

In one aspect, an example voice control system for a police vehicle includes: a single azimuthally-sensitive directional microphone configured to receive an audio command for controlling an aspect of the police vehicle and identify a direction of origin of the audio command; and a controller including a processor and tangible memory encoding instructions which, when executed by the processor, cause the controller to: identify a command associated with the audio command received by the single azimuthally-sensitive directional microphone; and when the direction of origin allows for the command, initiate the command to control the aspect of the police vehicle This summary is provided to introduce a selection of concepts, in a simplified form, that are further described below. This summary is not intended to be used in any way to limit the scope of the claimed subject matter.

DETAILED DESCRIPTION

The present disclosure is directed to a voice control system for an emergency vehicle. The voice control system can be used to control various aspects of the emergency vehicle.

Figure 1:
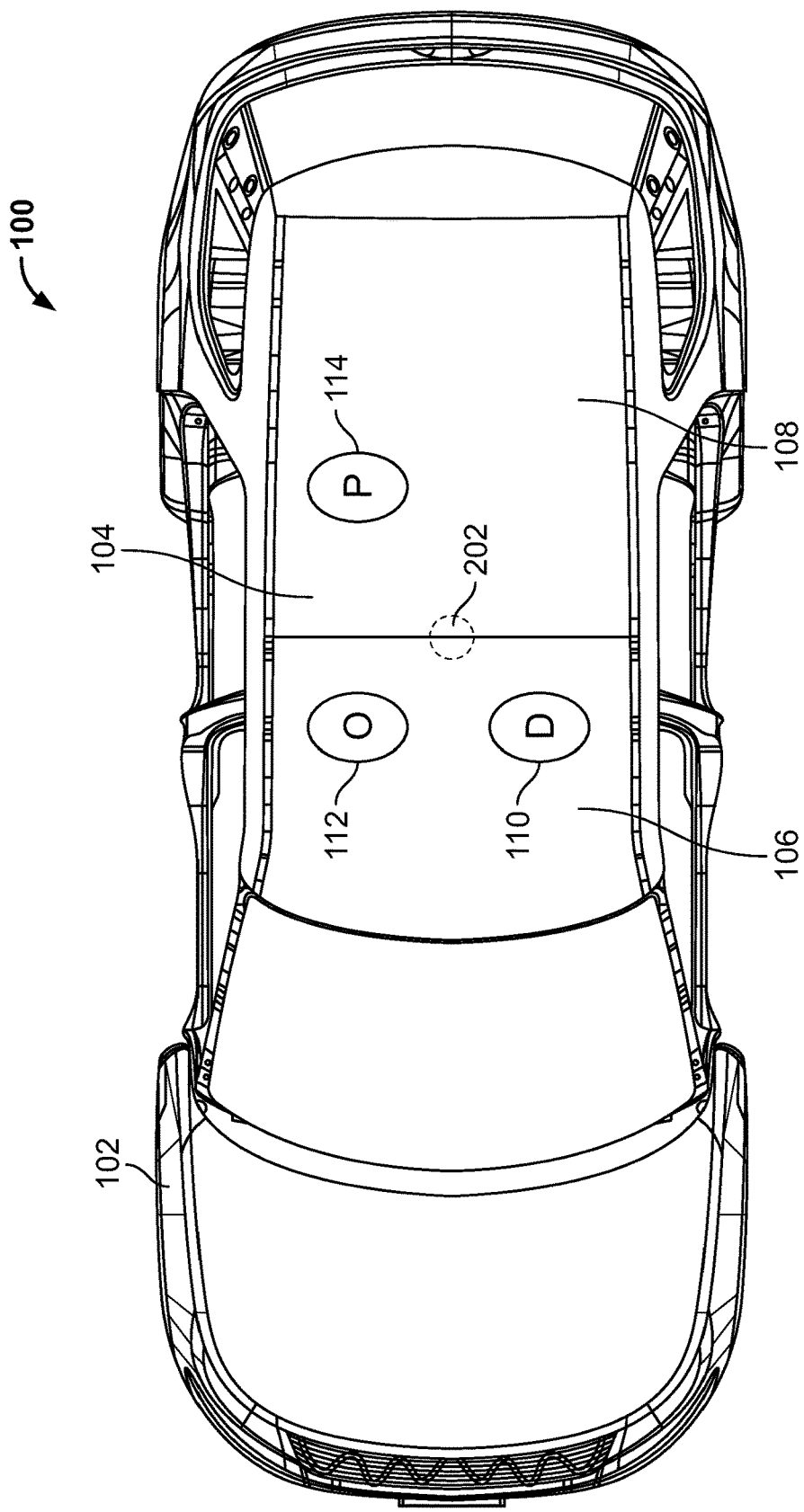
FIG. 1 shows an example emergency vehicle including a voice control system.
Figure 2:
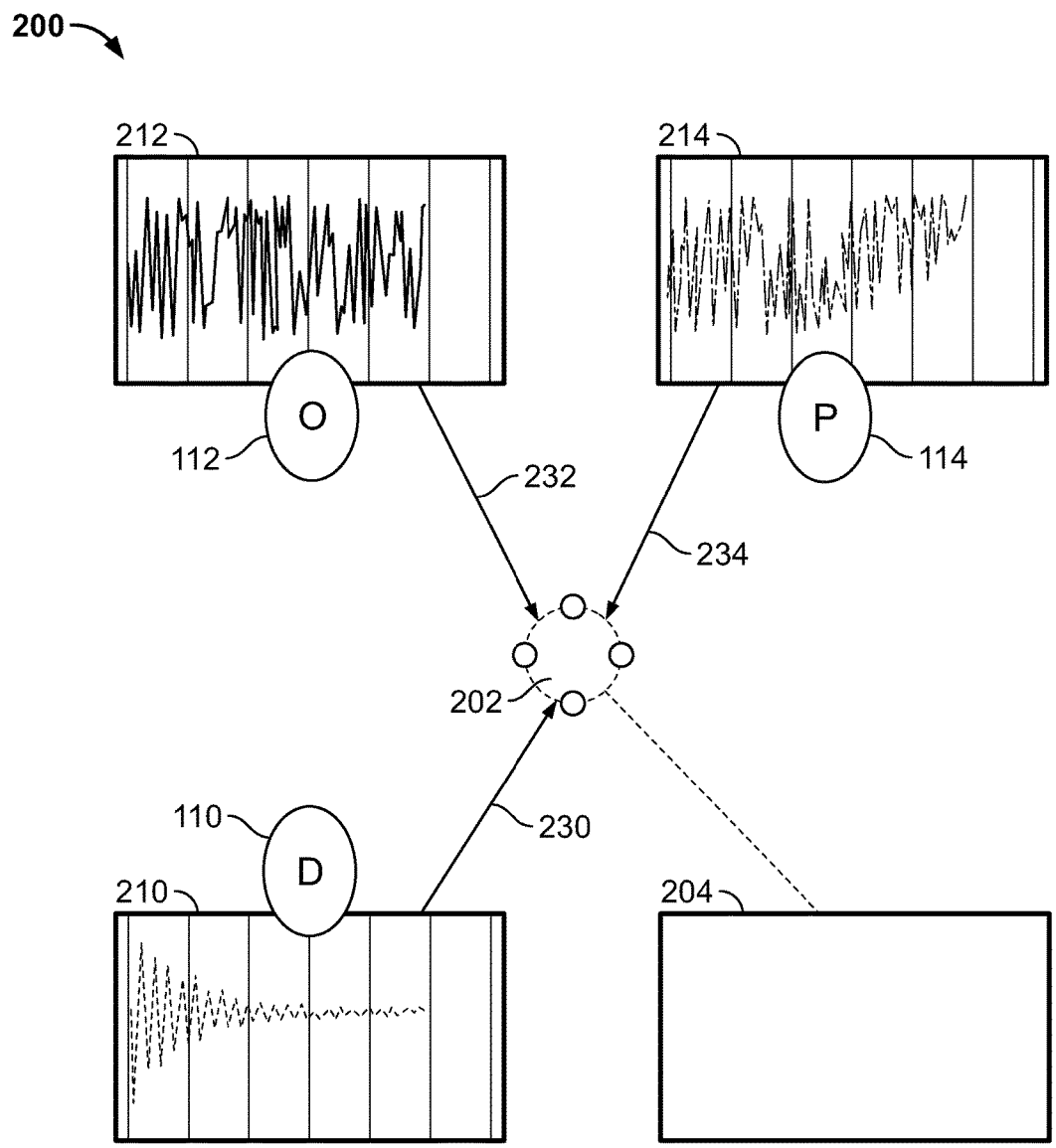
FIG. 2 shows the voice control system of FIG. 1.

Referring now to FIGS. 1-2, an example system 100 includes an emergency vehicle 102 having front seat(s) 106 and rear seat(s) 108.

In this example, the emergency vehicle 102 is a police vehicle. In such a vehicle, the front seats 106 are typically divided from the rear seats 108 by a partition that limits the access of passengers seated in the rear seats 108. For example, in one typical scenario, one or more police officers (or other passengers) 110 (driver) and/or passengers 112 are located in the front seats 106, and one or more apprehended individuals (e.g., suspect(s)/prisoner(s)) 114 are located in the rear seats (prisoner transport area) 108. In other examples, other types of emergency vehicles, such as fire and ambulance, can also be used.

Also positioned in the emergency vehicle 102 is a voice control system 200. In this embodiment, the voice control system 200 includes an azimuthally-sensitive directional microphone 202 and a controller 204 positioned in the emergency vehicle 102.

Generally, the voice control system 200 is configured to receive audible commands from the occupants of the emergency vehicle 102. These audible commands can be used to control various aspects of the emergency vehicle 102 without requiring use of the occupants' hands (i.e., hands-free). Examples of such commands include control of various aspects of the vehicle, such as the lights, radio, climate, etc.

In this example, the azimuthally-sensitive directional microphone 202 is a single azimuthally-sensitive directional microphone. In these examples, the azimuthally-sensitive directional microphone is positioned within a single housing (as depicted) and includes one or more transducers that are configured to sense sound from a particular direction.

The azimuthally-sensitive directional microphone 202 allows the location of the source of various audio signals to be identified, making it possible to distinguish voice commands uttered at the location of the driver 110 from conflicting voice signals uttered by other occupants of the emergency vehicle 102, such as the prisoner 114 or passenger(s) 112, or other sources of audio noise that might corrupt the interpretation of the driver's voice command, such as a radio or the sound of a car horn, siren, or other inside or outside noise. See FIG. 3, described below.

In this example, the azimuthally-sensitive directional microphone 202 is installed in the ceiling 104 of the emergency vehicle 102 in a central location positioned between the various seats of the emergency vehicle 102. The controller 204 can be positioned at various locations within the emergency vehicle 102, such as behind the dashboard, in the trunk, or in a light bar. In another example, the azimuthally-sensitive directional microphone 202 and the controller 204 are integrated into a single unit. The azimuthally-sensitive directional microphone 202 is configured to communication with the controller 204 using one or more wired and/or wireless communication schemes.

The azimuthally-sensitive directional microphone 202 is configured such that the azimuthal direction 230 from the azimuthally-sensitive directional microphone 202 to the driver 110 in the driver's seat is distinct from the azimuthal direction 232 from the azimuthally-sensitive directional microphone 202 to the passenger(s) 112, the azimuthal direction 234 of the rear seats 108 with the prisoner 114, and other sources of internal noise like the vehicle's radio.

In one example, the azimuthally-sensitive directional microphone 202 is the ReSpeaker microphone array manufactured by Seeed Development Limited of San Leandro, Calif. Other types of microphones and similar devices can also be used. Such devices can receive audio signals and identify a direction of origin of those audio signals.

By permitting only certain system functions for the emergency vehicle 102 to be triggered by voice commands originating from a given azimuth direction (e.g., driver 110), this approach will prevent the activation of those functions by other persons within the emergency vehicle 102 (e.g., passenger(s) 112 or prisoner 114). Similarly, this approach will prevent the prisoner 114 or passenger(s) 112 from interfering with voice commands issued by the driver 110.

Specifically, the azimuthally-sensitive directional microphone 202 can receive an audible command and report both the audio and azimuthal direction(s) of origin of that command to the controller 204. The controller 204 can process the audio to identify the desired command. The controller 204 can thereupon initiate that command within the emergency vehicle 102, assuming such a command is allowed.

For example, if the driver 110 issues an audible command to "activate light bar," the azimuthally-sensitive directional microphone 202 can receive the audio and report the audio and azimuthal direction(s) of origin of the audio to the controller. The controller 204 can process the audio and identify the command to activate the light bar. Assuming such a command is allowed (e.g., has been issued from an allowed direction of origin), the controller 204 can activate the light bar of the emergency vehicle 102. Similarly, the command can be ignored or otherwise denied if the controller 204 determines that identity is from a location that is not allowed (e.g., from the passenger or apprehended individual(s)).

Figure 3:
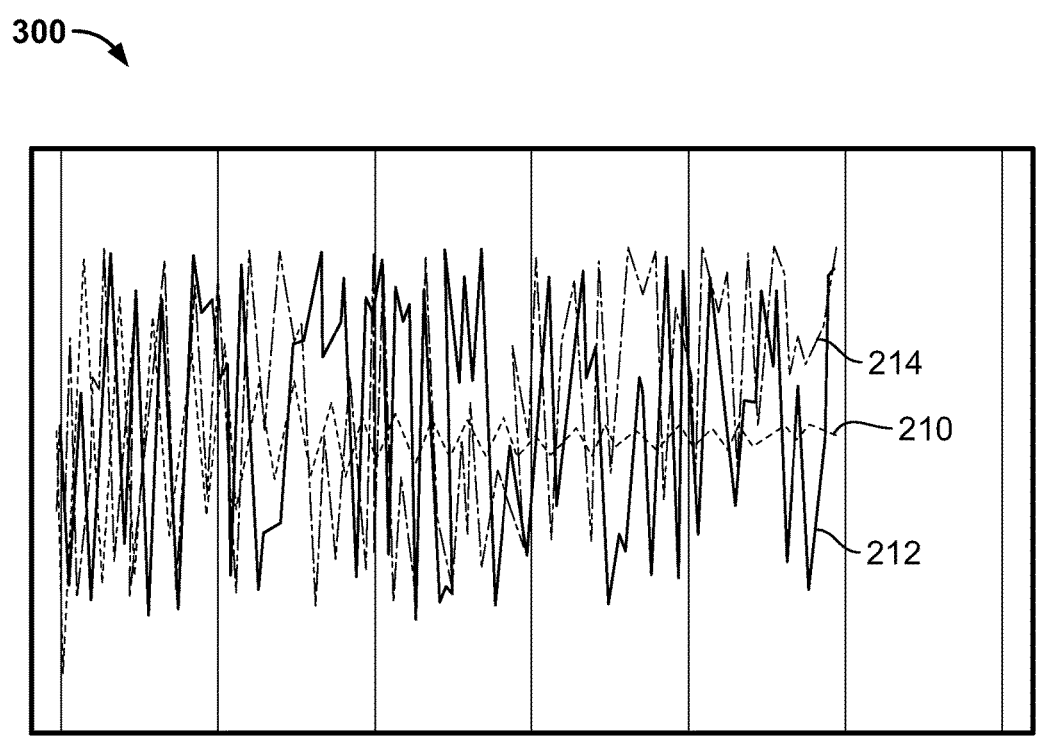
FIG. 3 shows a plot of audio signals received by the voice control system of FIG. 1.

As shown in a plot 300 of various audio 210, 212, 214 (e.g., voices) shown in FIG. 3, this approach may be extended to allow or disallow specific voice commands (or a range of voice commands) from particular locations in the emergency vehicle 102 or azimuthal directions of origin 230, 232, 234 around the azimuthally-sensitive directional microphone 202. The following table provides examples of commands and the allowed azimuthal direction(s) of origin for those commands.

| Command/Function | Allowed azimuthal direction(s) of origin |
| --- | --- |
| Radio volume up/down | Driver, passenger |
| Light bar activation | Driver |
| Siren activation | Driver |
| Radio communication(s) | Driver, passenger |
| Climate control(s) | Driver, passenger, prisoner |
| Cabin light(s) | Driver, passenger |
| Lock/unlock door(s) | Driver, passenger |
| Segregation of voice recordings into distinct channels | Driver, passenger, prisoner |

For example, according to the table, only an audio command with an azimuthal direction(s) of origin 230 from the driver 110 would be allowed to activate the light bar of the emergency vehicle. The audio 212, 214 from other directions of origin would be filtered by the controller 204.

In some examples, the voices can be recorded by the system. In those examples, the voices can be segregated (based upon direction of receipt), so that each voice is recorded separately or on a different channel. In this manner, the captured voices can be independently stored and retrieved at a later date.

In another optional embodiment, an approach is used where the acoustic signature of the driver's voice 210 is recognized by the voice control system 200 and used for additional discrimination of the driver's voice 210 from other sources of conflicting and corrupting audio signals. For example, the acoustic signature of the driver's voice 210 can be stored in the controller 204 and be used to match an audio signal to the acoustic signature. This process can be used in place of or in addition to identifying the direction of origin of an audio signal, as described above.

Other embodiments are also possible. For example, the controller 204 can be configured to identify when the driver 110 is absent from the emergency vehicle 102. For example, a pressure sensor can be positioned in the seat of the driver to determine when the driver 110 is present or absent. When absent, the controller 204 is programmed to ignore all audio commands originating from the rear seats 108 of the emergency vehicle 102. This limits the ability of the prisoner 114 to control any aspect of the emergency vehicle 102 when the driver 110 is absent.

In another example, transfer of command and control from the driver 110 to the passenger(s) 112 can be accomplished upon direction by the driver 110 and/or when the driver 110 becomes incapacitated or unable to provide verbal commands to the voice control system 200. Other configurations are possible.

In further embodiments, the audio commands can be stored (the raw audio signal and/or the commands) for later review. For example, the controller 204 can be configured to store the audio and commands issued within the emergency vehicle 102 for a period of time and/or until additional storage space is needed.

Figure 4:
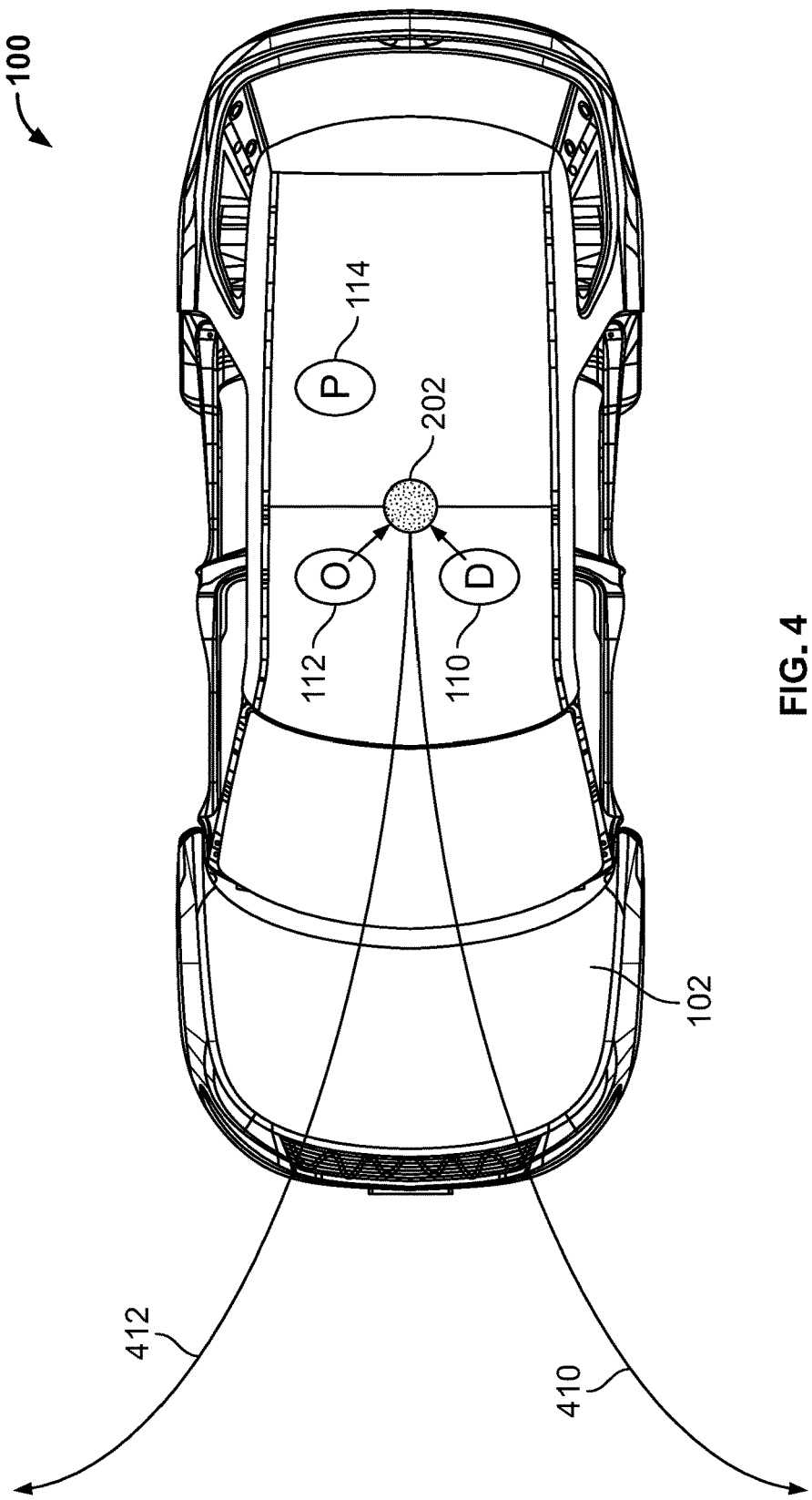
FIG. 4 shows the emergency vehicle of FIG. 1 with multiple communication channels.

Referring now to FIG. 4, in another embodiment, the azimuthally-sensitive directional microphone 202 allows audio signals from different locations in the emergency vehicle 102 to be routed to different off-vehicle wireless communication channels 412, 414 accomplished using various communication schemes and/or technologies, such as RF, WiFi, cellular, etc.

For example, in the illustrated embodiment, the audio from the location of the passenger 112 can be routed through the communication channel 412 to the audio input of a radio transmitting to another vehicle, while the audio signal from the location of the driver 110 can be routed through the communication channel 412 to the audio input of a cellular telephone call, where the receiver of the radio transmission and the receiver of the telephone call are not necessarily the same entity.

Other configurations are possible. For example, the controller 204 can be programmed to automatically determine the content or context of the audio and route the audio to the appropriate communication channel. In one scenario, the controller 204 can be configured to automatically determine that the driver 110 has requested backup (e.g., when the driver says "backup needed") and route the audio through the communication channel 410 to the central station, while the controller 204 can determine that the passenger 112 wants to place a call (e.g., when the passenger says "Call home") and route the audio through the communication channel 412 to a cellular network.

Figure 5:
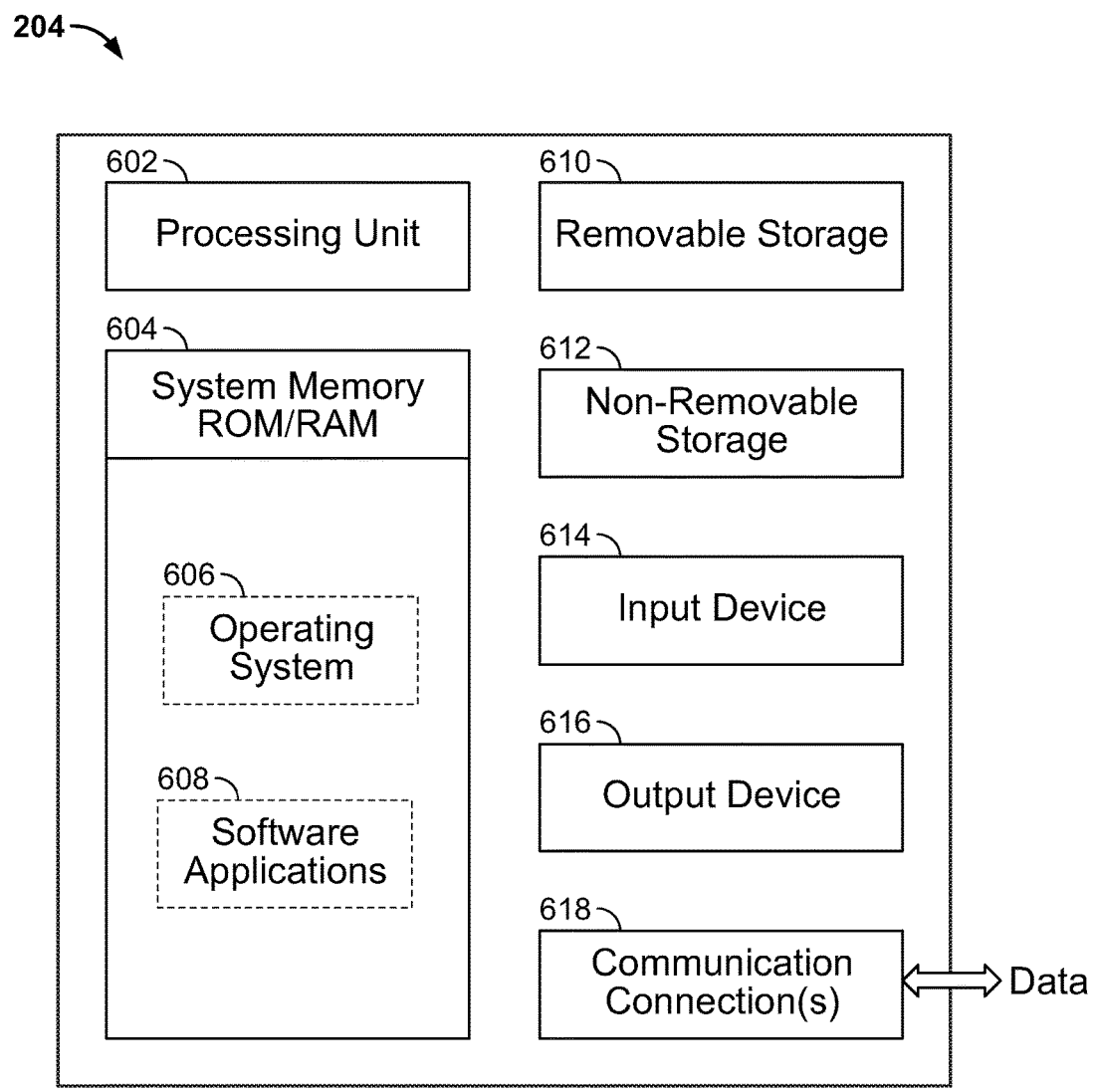
FIG. 5 shows a schematic view of example components of the controller of the voice control system of FIG. 1.

Referring now to FIG. 5, a schematic view of example components of the controller 204 of the voice control system 200 are shown. Generally, the controller 204 includes various components of a computing device.

The controller 204 includes a processing unit 602 and a system memory 604. The system memory 604 stores an operating system 606 for controlling the operation of the controller 204 and the azimuthally-sensitive directional microphone 202. The system memory 604 further includes one or more software applications 608. Software applications 608 include many different types of single and multiple-functionality programs that control various aspects of the functionality of the controller 204. Other embodiments are possible.

The system memory 604 is computer-readable media. Examples of computer-readable media include computer storage media and communication media. Computer storage media is physical and/or tangible media that is distinguished from communication media.

Computer storage media includes physical volatile and non-volatile, removable and non-removable media implemented in any method or technology for storage of information such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other physical medium which can be used to store the desired information. Any such computer storage media may be part of or external to the voice control system 200. Such storage is illustrated by removable storage 610 and non-removable storage 612.

Communication media is typically embodied by computer-readable instructions, data structures, program modules, or other data, in a modulated data signal, such as a carrier wave or other transport mechanism, and includes any information delivery media. The term "modulated data signal" describes a signal that has one or more of its characteristics set or changed in such a manner as to encode information in the signal. By way of example, communication media includes wired media such as a wired network or direct-wired connection, and wireless media such as acoustic, RF, infrared and other wireless media.

The controller 204 also includes any number and type of an input device 614 and output device 616. An example input device 614 includes a keyboard, mouse, pen, voice input device, touch input device, and others. An example output device 616 includes a display, speakers, printer, and others. The controller 204 also includes a communication connection 618 configured to enable communications with other computing devices directly and/or over a network in a distributed computing system environment, such as the azimuthally-sensitive directional microphone 202.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

There can be various advantages associated with the systems and methods described herein. For example, by freeing drivers, in particular, of the need to use their hands to activate devices in the emergency vehicle, drivers are relieved of the need to take their eyes off the road and their hands off the vehicle controls. This is of particular usefulness for police officers and other first responders, who are often tasked with driving at high rates of speed along roads congested with traffic and other hazards.

Further, the environment associated with the emergency vehicle can be noisy and chaotic. This can make voice command difficult to implement due to the possibility of the vehicle carrying suspect and/or non-suspect passengers in the rear prisoner compartment and/or the front passenger's seat, or due to the presence of an actively broadcasting radio. The presence of audio signals from any of these sources can conflict with or corrupt voice commands uttered by the driver of the vehicle. As described, the voice control system can be configured to filter out these extraneous audio sources.

In addition, it can be advantageous to use a single, unitary azimuthally-sensitive directional microphone. The single, unitary azimuthally-sensitive directional microphone reduces the possible costs associated with positioning multiple arrays at different locations throughout the vehicle. Further, the single azimuthally-sensitive directional microphone provides a single audio input to the controller, which allows the controller to be more efficient when processing the audio input.

Other configurations are possible. For example, although a single microphone array is used in this example and is preferred, in other embodiments, multiple arrays can be used. For example, in another embodiment, multiple microphone arrays can be positioned at various locations throughout the emergency vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A voice control system for a police vehicle, the voice control system comprising:
    a single azimuthally-sensitive directional microphone configured to receive an audio command for controlling an aspect of the police vehicle and identify a direction of origin of the audio command; and
    a controller including a processor and tangible memory encoding instructions which, when executed by the processor, cause the controller to:
        identify a command associated with the audio command received by the single azimuthally-sensitive directional microphone;
        when the direction of origin allows for the command, initiate the command to control the aspect of the police vehicle; and
        when an identity of the location within the police vehicle is determined to be other than a driver location, disallow the audio command.

2. The voice control system of claim 1, wherein the single azimuthally-sensitive directional microphone is positioned centrally within a ceiling of the police vehicle.

3. The voice control system of claim 1, wherein the tangible memory encodes further instructions which, when executed by the processor, cause the controller to compare the audio command to an acoustic signature to identify an individual who voiced the audio command.

4. The voice control system of claim 1, wherein the tangible memory encodes further instructions which, when executed by the processor, cause the controller to store the audio command for later review.

5. The voice control system of claim 1, wherein the tangible memory encodes further instructions which, when executed by the processor, cause the controller to select among a plurality of communication channels over which to send the audio command.

6. The voice control system of claim 1, wherein the tangible memory encodes further instructions which, when executed by the processor, cause the controller to differentiate between a driver location and a passenger location in the police vehicle.

7. An emergency vehicle, comprising:
a driver location;
a passenger location; and
a voice control system for a police vehicle, the voice control system comprising:
  a single azimuthally-sensitive directional microphone configured to receive an audio command for controlling an aspect of the police vehicle and identify a direction of origin of the audio command; and
  a controller including a processor and tangible memory encoding instructions which, when executed by the processor, cause the controller to:
    identify a command associated with the audio command received by the single azimuthally-sensitive directional microphone;
    when the direction of origin allows for the command, initiate the command to control the aspect of the police vehicle; and
    when an identity of the location within the police vehicle is determined to be other than a driver location, disallow the audio command.

8. The emergency vehicle of claim 7, wherein the single azimuthally-sensitive directional microphone is positioned centrally within a ceiling of the emergency vehicle.

9. The emergency vehicle of claim 7, wherein the tangible memory encodes further instructions which, when executed by the processor, cause the controller to compare the audio command to an acoustic signature to identify an individual who voiced the audio command.

10. The emergency vehicle of claim 7, wherein the tangible memory encodes further instructions which, when executed by the processor, cause the controller to store the audio command for later review.

11. The emergency vehicle of claim 7, wherein the tangible memory encodes further instructions which, when executed by the processor, cause the controller to select among a plurality of communication channels over which to send the audio command.

12. The emergency vehicle of claim 7, wherein the tangible memory encodes further instructions which, when executed by the processor, cause the controller to differentiate between the driver location and the passenger location in the police vehicle.

13. A method for receiving an audible command in an emergency vehicle, the method comprising:
  receiving an audio command using a single azimuthally-sensitive directional microphone in the emergency vehicle;
  determining a direction of origin of the audio command within the emergency vehicle;
  executing the audio command when the direction of origin allows the audio command to be executed; and
  disallowing the audio command when an identity of the location within the police vehicle is determined to be other than a driver location.

14. The method of claim 13, further comprising positioning the single azimuthally-sensitive directional microphone centrally within a ceiling of the emergency vehicle.

15. The method of claim 13, further comprising comparing the audio command to an acoustic signature to identify an individual who voiced the audio command.

16. The method of claim 13, further comprising selecting among a plurality of communication channels over which to send the audio command.

17. The method of claim 13, further comprising differentiating between a driver location and a passenger location in the emergency vehicle.

* * * * *